United States Patent [19]

Alkofer

[11] Patent Number: 4,636,845

[45] Date of Patent: Jan. 13, 1987

[54] DIGITAL IMAGE PROCESSING METHOD FOR OVER AND UNDER EXPOSED PHOTOGRAPHIC IMAGES

[75] Inventor: James S. Alkofer, Hamlin, N.Y.

[73] Assignee: Eastman Kodak Company, Rochester, N.Y.

[21] Appl. No.: 730,625

[22] Filed: May 6, 1985

[51] Int. Cl.$^4$ .......... G03F 3/08; H04N 1/46; H04N 1/40; G03B 27/80

[52] U.S. Cl. .......... 358/80; 358/75; 358/280; 358/284; 355/38

[58] Field of Search .......... 358/75, 76, 78, 80, 358/280, 283, 284, 256; 382/18; 355/38, 35, 40, 41, 77, 88, 68

[56] References Cited

U.S. PATENT DOCUMENTS

| | | | |
|---|---|---|---|
| 4,168,120 | 9/1979 | Freier et al. | 355/38 |
| 4,339,517 | 7/1982 | Akimoto | 355/38 |
| 4,410,909 | 10/1983 | Ueda et al. | 358/78 |
| 4,467,364 | 8/1984 | Konagaya | 358/76 |
| 4,472,736 | 9/1984 | Ushio et al. | 358/75 |

OTHER PUBLICATIONS

"A New Approach to Programming in Photomechanical Reproduction", by Yu. Ovchinnikov et al., W. Banks IPC Science and Technology Press, Guildford, England, 1974, pp. 160-163.

Primary Examiner—James J. Groody
Assistant Examiner—Randall S. Svihla
Attorney, Agent, or Firm—James S. Alkofer

[57] ABSTRACT

In a method of digital image processing employing a tone reproduction function generated by normalizing the histogram of a sample of tone values selected from the image, it is an object to automatically detect images that were derived from over or under exposed photographic originals and to adjust the tone scale of such images to improve their appearance. The invention achieves this objective by testing the skewness of the sample of tone values of the image and if the amount of skewness exceeds a predetermined amount, adjusting the contrast of the processed image by an amount equal to the value of a standard variate computed for the sample at a mean tone value of the sample minus the value of a standard variate computed for the sample at a mode of the tone values of the sample.

5 Claims, 8 Drawing Figures

DIGITAL IMAGE PROCESSING METHOD FOR OVER AND UNDER EXPOSED PHOTOGRAPHIC IMAGES

TECHNICAL FIELD

The invention relates to digital image processing methods, and more particularly to a method for processing digital images derived from photographic images that were over or under exposed.

BACKGROUND ART

A digital image processing method has been proposed, wherein a sample of tone values from the informational portion of the digital image is normalized to produce a tone reproduction function. The tone reproduction function is then applied to the digital image to produce a processed digital image having an aesthetically improved appearance. This approach to tone reproduction is described in the article entitled "A New Approach to Programming in Photomechanical Reproduction" by Yu. Ovchinnikov et al., the 12th IARIGAI Conference Proceedings, Versailles, France, Editor: W. Banks IPC Science and Technology Press, Guildford, England 1974, pages 160–163. Briefly, the method of Ochinnikov et al., involves scanning an original image and randomly sampling the tone values (lightness) occuring in parts of the image where the first derivative of the lightness is above some predetermined minimum threshold value. These sampled tone values are compiled in a relative frequency histogram and the histogram is normalized to produce a tone reproduction function. The tone reproduction function is then applied to the entire digital image to improve the aesthetic appearance of the image.

Improvements to the digital image processing method of Ochinnikov et al., whereby the sample of tone values is selected from an image-dependent "floating" contrast interval selected as a function of the statistics of the tone values in the contrast interval, and wherein the contrast of the image is adjusted as a function of the standard deviation of tone values in the image are disclosed in copending U.S. patent application Ser. Nos. 730,630 and 730,629 respectively. The method is extended to color image processing in the copending U.S. patent application Ser. No. 730,627.

This method produces an aesthetic improvement in the processed image in a majority of instances. However, when the digital image was derived from an over or under exposed photographic original, further improvement in the appearance of the processed image is desirable.

It is the object of the present invention to provide an improved digital image processing method of the type described above for detecting and improving the appearance of a digital image derived from an over or under exposed photographic original.

DISCLOSURE OF THE INVENTION

The object of the invention is achieved by testing the statistics of the sample of tone values employed to generate the tone reproduction function, for skewness. If the skewness of the sample exceeds a predetermined value, the digital image is assumed to have derived from an over or under exposed photographic original. In that event, a tone scale bias is applied to the processed digital image values in an amount equal to the value of the standard variate computed from the sample of tone values at the mean value of the sample minus the value of the standard variate at the mode of the sample.

In an application of the invention to a color digital image, the test is applied to one of the colors (e.g. green), the bias is generated from the sample of color values of the one color, and the bias is applied to all the colors in the digital image.

BRIEF DESCRIPTION OF THE DRAWINGS

The invention will be described with reference to the drawings wherein.

MODES OF CARRYING OUT THE INVENTION

The general method of testing for under or over exposure and adjusting the tone scale of a digitally processed image according to the present invention will first be described with reference to FIG. 1.

Figure 1:
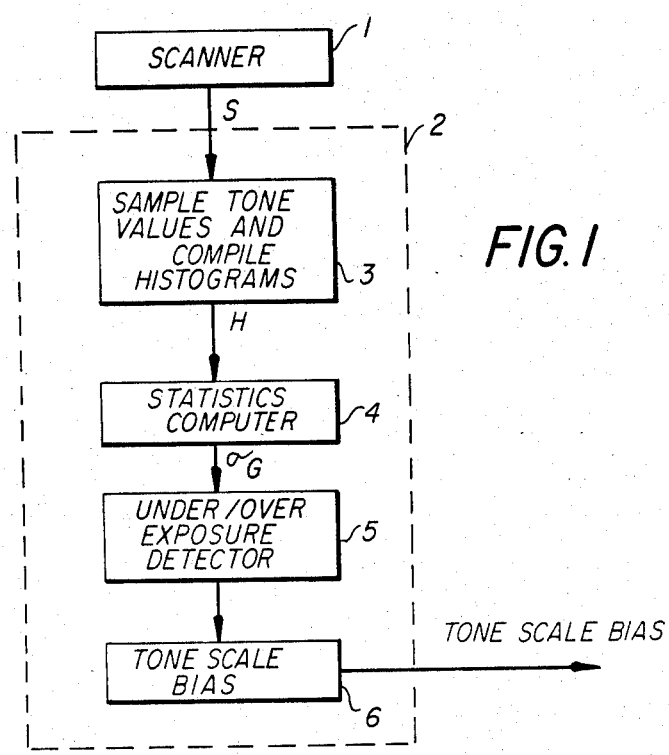
FIG. 1 is a block diagram illustrating the basic steps of testing for over or under exposure and adjusting the tone-scale of the digital image according to the invention.

In FIG. 1, a scanner 1 scans a film image to provide a digital image signal S. A digital computer 2 receives the digital image signal S, and is programmed as described below to provide a tone value sampler and histogram compiler 3 for sampling the tone values from the informational part (edges) of the digital image and compiling a histogram H of the sampled tone values. A statistics computer 4 receives the histogram data H and computes the statistical moments of the histogram. An under and over exposure detector 5 tests the statistics for evidence of under or over exposure by comparing the value of the skewness of the distribution with a predetermined constant. The inventor has discovered that the skewness of the distribution is a reliable indicator of under or over exposure. The skewness is represented by the third standardized statistical moment of the distribution. If over or under exposure is detected, as evidenced by the skewness of the distribution exceeding the predetermined constant, a tone scale bias generator 6 generates a tone scale bias equal to the value of the standard variate at the mean tone scale value minus the value of the standard variate at the mode of the tone scale values. The tone scale bias is then applied to all the processed tone values in the processed digital image.

This method is readily extended to processing a digital color image, by testing one of the components (e.g. luminance or green) of the digital color image for over or under exposure, generating the bias from the one component, and applying the bias thus generated to all of the color components in the digital color image. The detailed description of a specific mode of practicing the invention will be directed to such a digital color image processing method.

Figure 2:
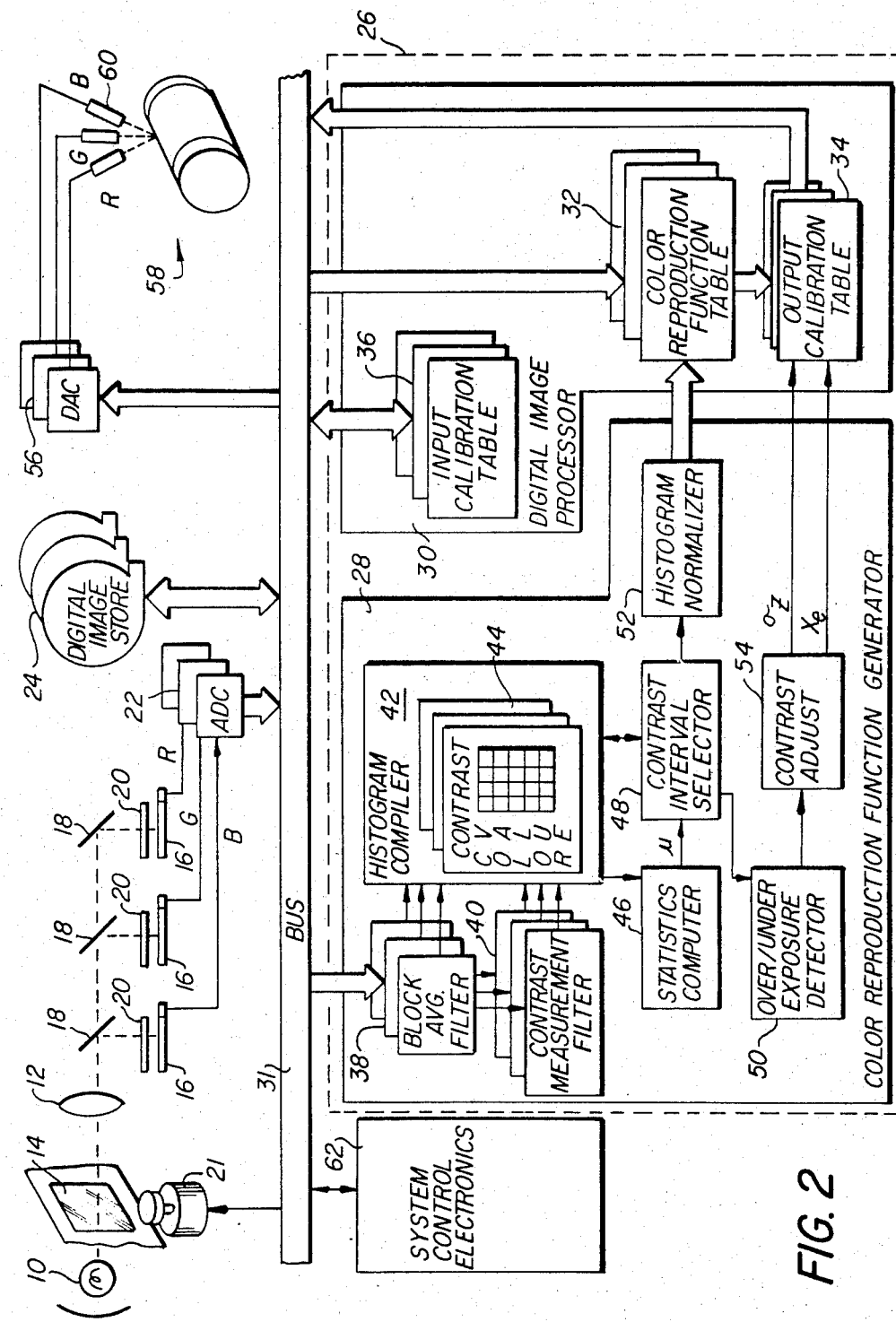
FIG. 2 is a schematic diagram illustrating a scanning color printer useful for practicing the method of the invention.

Turning now to FIG. 2, an example of a scanning color printer used to practice the present invention will be described. The input device includes a light source 10 and lens 12 for projecting an image of color negative film 14 onto three solid state image sensing arrays 16, such as CCD image sensors. The image is directed to the image sensing array 16 by dichroic beam splitters 18 through color trimming filters 20, to form a red, green and blue separation image on the respective image sensors. A film advance motor 21 advances the film in the printer. The image sensors 16 scan the color images to produce three color separation signals R, G and B. The signals thus produced are supplied to analog-to-digital converters 22 that each produce an 8-bit output code representing one of 256 possible signal levels for each sample point in the three colors.

The digital color-image signals are stored in a digital image storage memory 24, such as a magnetic tape, disc, or solid state semiconductor memory. The digital color image signals are processed in a digital computer 26. A DEC 2060 mainframe computer was used.

The digital computer 26 is programmed to include a color reproduction function generator 28 and a digital image processor 30. The digital image processor 30 applies color reproduction functions generated by color reproduction function generator 28 to the digital color image. The color reproduction function generator 28 receives the digital color image from the digital image storage device 24 via data and control bus 31 and generates a color reproduction function table 32 for each color. The color reproduction function generator 28 also generates multiplicative and additive constants for adjusting the tone scale of the processed image as described below. The constants are supplied to the three output device calibration tables 34.

Prior to storing the digital color image in digital image store 24, each input signal level is converted to an input color value, such as photographic density, by a known scanner calibration function. The calibration function for each color is implemented in the form of a look up table 36 in the digital image processor 39, to convert each 8-bit input value to an 8-bit value representing the color negative density at the scanning point.

The color reproduction function generator 28 includes digital filters 38 for performing a block average of the color value samples of the color components of the digital color image. Digital filters 40 measure the contrast of the image around each block averaged color value sample in each of the three colors. A histogram compiler 42 compiles the block averaged color values from a plurality of contrast intervals in each color, in a plurality of histogram memories 44.

Figure 3:
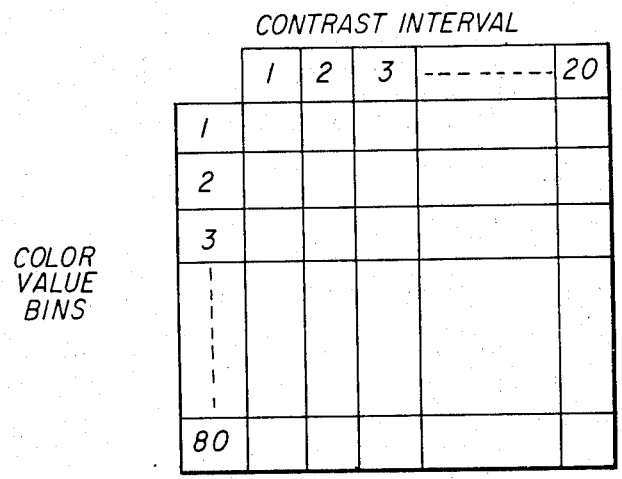
FIG. 3 is a schematic diagram showing the organization of the histogram memories used in the apparatus of FIG. 2.

FIG. 3 shows, in a graphic way, the organization of one of the histogram memories 44 for one of the colors. There are twenty contrast intervals having a width of 0.04 log contrast units each. The width of the contrast intervals was chosen to be approximately twice the minimum visual log contrast threshold. The 256 color values are divided into 80 color value (density) bins, for a resolution of 0.05 density units per bin. Counts are accumulated in the appropriate color value bins in the histogram memories until all of the color values from the digital color image are counted.

A statistics computer 46 computes the first four standardized statistical moments $\mu$ of the distributions of color values in the histogram memories 44 as described below.

A contrast interval selector 48 receives the statistical moments $\mu$ and selects a contrast interval on the basis of the statistics of the distributions of color values in the contrast intervals. An over or under exposure detector 50 tests the skewness of the sample of green color values for the selected contrast interval to determine whether the photographic original was over or under exposed. Histogram normalizer 52 normalizes the histograms from the selected contrast interval to generate the color reproduction function lookup tables 32 for the digital image processor 30.

A contrast adjustment computer 54 receives the statistics of the sample of green color values in the selected contrast interval and the signal indicating over or under exposure and generates a multiplicative constant $\sigma_z$ used to determine the contrast of the processed image and an exposure bias $x_e$ to adjust the tone scale of under or over exposed images. The constants are provided to the output device calibration tables 34 in the digital image processor 30. Alternatively, the constants are incorporated in the color reproduction function tables 32. All the processed color values in all three colors are adjusted by these same multiplicative and additive constants.

The color reproduction function lookup tables 32 relate each of the 256 possible input values in the respective colors to one of 256 possible output values. After the color reproduction function lookup tables 32 have been generated, the digital image processor 30 processes the digital image by applying the color reproduction functions to the respective color components of the digital color image. The output calibration functions are then applied to the respective color components of the processed digital color image. The processed digital color image is converted to analog form by digital-to-analog converters 56. The processed analog color signal is then applied to an output scanning device 58 to reproduce the image. The output device 58 is a drum-type scanner having red, green and blue laser light sources 60 that are modulated by the respective red, green and blue analog color signals to expose a light sensitive medium such as color photographic paper. System control electronics 62 controls and coordinates the operation of input and output scanning devices and the signal processing computer 26.

The method of detecting over and under exposure and generating the color reproduction function and contrast and exposure bias constants $\sigma_z$ and $x_e$ will now be described in more detail with reference to the flow charts of FIGS. 4–7.

Figure 4:
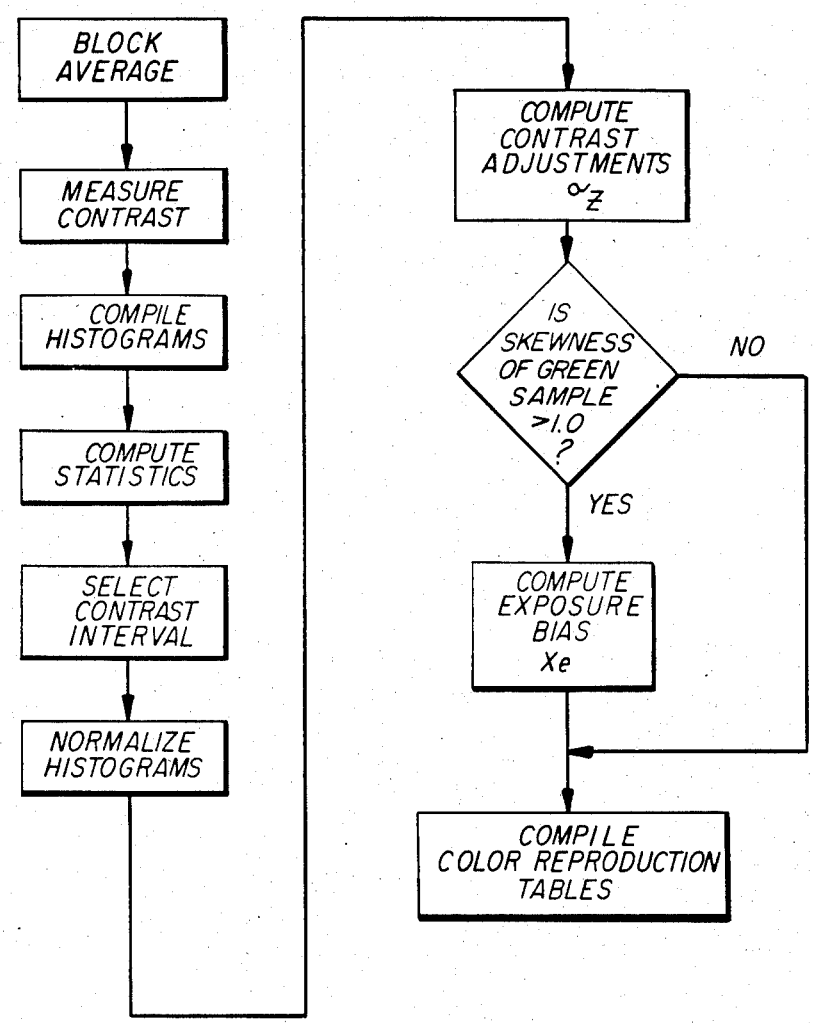
FIGS. 4–7 are flow charts illustrating the operation of the apparatus of FIG. 2 in carrying out the method of digital image processing according to the present invention.

Referring first to the flow chart of FIG. 4, the processing steps performed on the digital color image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} / 16 \qquad (1)$$

This averaging is performed by the block average filter 38, shown in FIG. 2, to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \quad (2)$$

is applied to the block averaged color values of the digital image to measure the contrast of the image at each block averaged sample point. The operation is performed by the contrast measurement filter 40, in FIG. 2. The Laplacian operator has the property of exhibiting no response to uniform areas or linear gradients, and exhibits a response only to changes in gradients. The Laplacian operator works well in measuring the contrast of the color component of the image. However, it is to be understood that other contrast measuring filters may be employed.

The respective histograms in each contrast interval for each color component are compiled as discussed above, and their statistics are computed. A contrast interval is selected on the basis of the statistical parameters of the color value distributions in the contrast interval, and the histograms of color values in the selected contrast interval are normalized to generate the respective color reproduction functions for each color. An overall contrast adjustment parameter $\sigma_z$ is calculated as a function of the standard deviation of the green color values in the selected contrast interval.

The statistics of the green color value distribution from the selected contrast interval are tested to determine whether the original image was over or under exposed by testing to see if the skewness of the green distribution is greater than 1.0. If the original image was over or under exposed, an exposure bias $x_e$ is determined as explained below.

Figure 5:
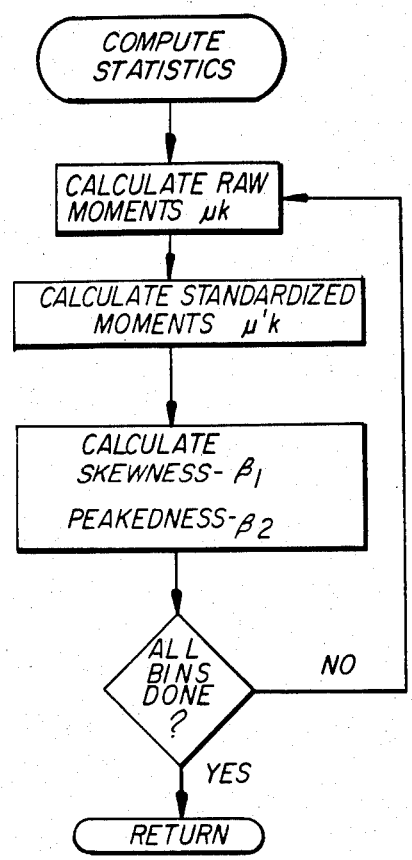

FIG. 5 is a flow chart showing the steps involved in compiling the histogram statistics for each contrast interval. The raw moments $\mu_k$ taken about the mean are computed as follows:

$$\mu_k = \frac{1}{N} \left( \sum_{i=1}^{N} (x_i - \bar{x})^k \right) \quad (3)$$

where

N is total number of samples in the contrast interval;
$x_i$ is a color value; and
$\bar{x}$ is the mean color value. The standardized central moments $\mu'_k$ are calculated as follows:

$$\mu'_k = \frac{\mu_k}{\sigma^k}, \text{ where } \sigma = \sqrt{\mu_2} \quad (4)$$

The coefficient of symmetry (skewness) for each distribution is then represented as $$\beta_1 = (\mu'_3)^2 \quad (5)$$

and the coefficient of peakedness (kurtosis plus 3) is represented as $$\beta_2 = \mu'_4 \quad (6)$$

Figure 6:
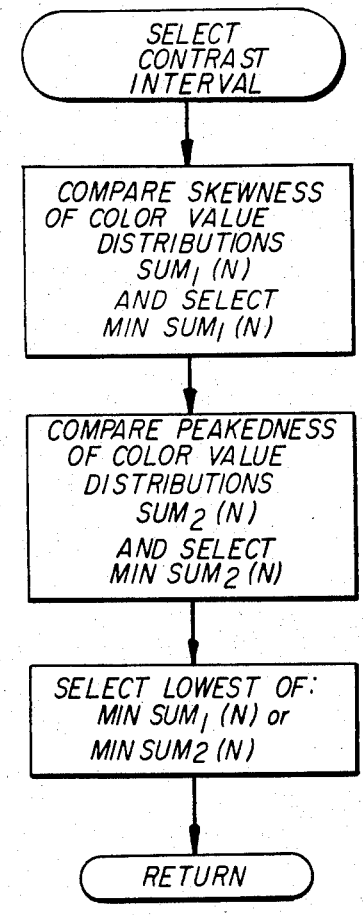

Referring to FIG. 6, the contrast interval selection criteria involves, for example, the similarity of shape of the three color distributions in the contrast interval. The selection criteria compares the skewness of the color distributions in each of the contrast intervals as follows:

$$SUM_1(N) = |\beta_{1R} - \beta_{1G}| + |\beta_{1B} - \beta_{1G}| + |\beta_{1R} - \beta_{1B}| \quad (7)$$

where $SUM_1$ (N) is a measure of the difference in skewness between the three color distributions in the Nth contrast interval. The contrast interval having the most similar distribution, i.e. the lowest value of $SUM_1$ (N) is identified.

Next, the peakedness of the three color distributions in each contrast interval is compared as follows:

$$SUM_2(N) = |\beta_{2R} - \beta_{2G}| + |\beta_{2B} - \beta_{2G}| + |\beta_{2R} - \beta_{2B}| \quad (8)$$

where $SUM_2$ (N) is a measure of difference in peakedness between the three color distributions in the Nth contrast interval. The contrast interval having the most similar distributions, i.e. the lowest value of $SUM_2$(N) is identified.

Finally, the lowest contrast interval (i.e. the interval representing the lowest contrast) between the two identified contrast intervals is selected.

Figure 7:
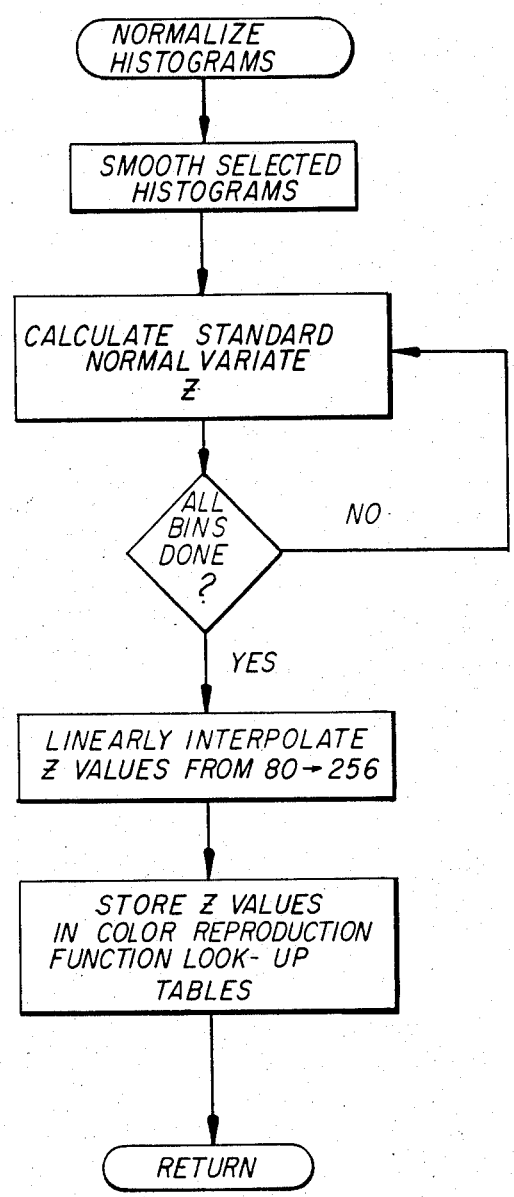

Turning now to FIG. 7, the steps involved in normalizing the color value histograms in the selected contrast interval to generate the color reproduction functions will be described. To normalize a histogram, the standard normal variate Z for all 80 color value bins in the contrast interval is computed. First however, an average smoothing operation is performed on the selected color value distribution to remove any spikes. The smoothing is performed on the counts in 3 consecutive color value bins as follows:

$$h_i = \frac{1}{3}(h'_{i-1} + h'_i + h'_{i+1}) \quad (9)$$

where
$h'_i$ is the count in bin i and
$h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \quad (10)$$

where $t_j = \sqrt{\ln(1/P_j^2)}$
$a_0 = 2.30753 \quad b_1 = .99229$
$a_1 = 0.27061 \quad b_2 = .04481$ The probability $P_j$ for each of the 80 bins is given by $$P_j = \frac{\sum_{i=1}^{j} h_i}{\sum_{i=1}^{80} h_i} \quad (11)$$

where
$h_i$ are the smoothed counts in the ith color value bin, and
j = 1 to 80.

Next, the Z values are linearly interpolated from 80 to 256 values to provide a Z value for each of the 256 possible scanner input levels represented by the 8-bit digital code. Finally the 256 Z values are stored in the color reproduction function lookup table 32. This process is applied to each of the three samples of color values in the selected contrast interval.

Figure 8:
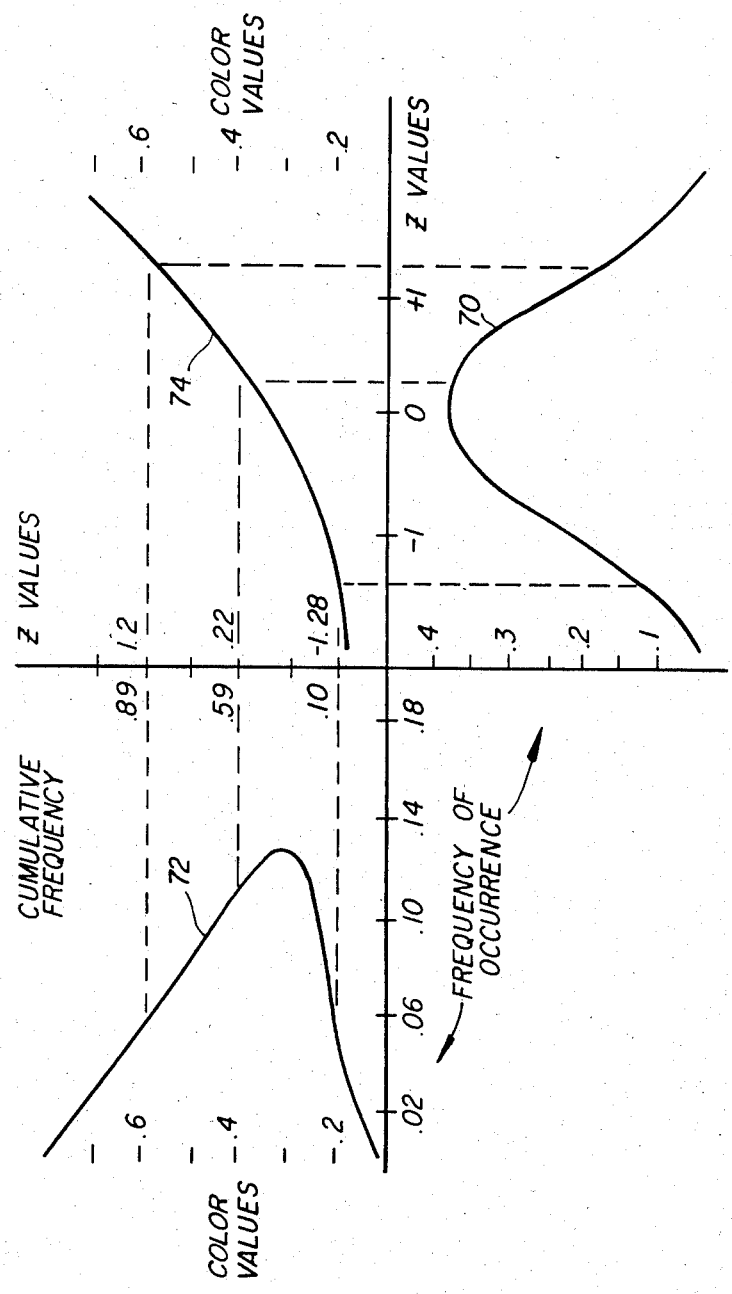
FIG. 8 is a graph illustrating the form of the color reproduction functions employed in the scanning color printing apparatus.

FIG. 8 is a graph showing the form of the color reproduction functions produced by normalizing the samples of color values. In the lower right quadrant of the graph, a curve labeled 70 represents a standard normal distribution showing the probability of the occurrence of a value plotted against the standard normal variate Z. In the upper left quadrant of the graph, the curve labeled 72 represents the sample of color values from the image, plotted against relative probability of occurrence. The central ordinate of the graph relates the relative probability $P_j$ of the color value distribution to Z values according to the relationship defined by equation 10. The color reproduction curve, labeled 74, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color values from the image are dimensionless quantities representing the Z values.

To recover the processed image, these dimensionless quantities are given magnitudes with respect to the original image and the output medium by multiplying the Z values with a multiplier $\sigma_z$ that adjusts the contrast of the processed image. To adjust the color balance of the image, a constant term is added to each of the three primary color values. The additive constant term relates the Z values in each color to the mean density of the output medium for the respective color, thereby causing equal Z values in all three colors to be reproduced as a shade of gray.

Appropriate values for the multiplier $\sigma_z$ that adjusts the contrast and the additive constants that determine the color balance of the processed image are determined as follows. The multiplier is computed based on the statistics of the green color values alone, but is applied to all three colors. The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R \quad (12)$$

where:
$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density Typical values for $\sigma_R$ and $\overline{G}$ for color photographic negative film are 0.31 and 0.68 respectively, such that $\sigma_D$ is 0.21. Departures from this average contrast must be compensated. A general equation may be stated as:

$$\sigma_z = m \cdot f(\sigma_s) + b \quad (13)$$

where:
$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the color reproduction function.

A simple and satisfactory implementation is obtained from:

$$b = \sigma_D \cdot (1.0 - m) \quad (14)$$

$$\sigma_z = m \cdot \sigma_s + b \quad (15)$$

where:
m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast-adjusted values of the respective colors. The complete calculation is given by:

$$\log E_{ZD} = -\sigma_z Z_D + \log E_A \quad (16)$$

where:
$\log E_A$ = log exposure required to obtain the aim paper density
$Z_D$ = translated Z value for some input density in the original image
$\log E_{ZD}$ = log exposure for $Z_D$.

The steps involved in calculating the contrast adjustment and exposure bias will be described. First an overall contrast adjustment $\sigma_z$ is calculated as described above. Next, the coefficient of skewness $\beta_1$ (the third standardized moment squared) of the green color value distribution in the related contrast interval is tested against a predetermined constant (the value 1.0 was found to work well). If the skewness is greater than the predetermined constant, over or under exposure is indicated. If over or under exposure is indicated, an exposure bias ($x_e$) is generated. The exposure bias $x_e$ is equal to the Z value at the mean tone value minus the Z value at the mode.

The biased value is then given as:

$$\text{Log } E_{ZD'} = -\sigma_z \times Z + \text{Log } E_A + x_e \quad (17)$$

Although the tone scale bias has been described as being implemented in the output device calibration tables 34, the bias could equally have been implemented by biasing the tone reproduction tables generated in histogram normalizer 52.

INDUSTRIAL APPLICABILITY AND ADVANTAGES

The method of detecting and treating digital images resulting from under or over exposed photographic originals according to the present invention is useful in the graphic arts and photographic printing fields. The method is advantageous in that a greater percentage of high quality processed images are automatically produced, without the need for operator intervention.

The invention is especially useful with scanning color photographic printers employing digital image processing of the type that includes statistical modification of the tone value distribution, since the stastistics necessary for determining under and over exposure are readily available, and the corrections are readily implemented in dimensionless statistical space.

What is claimed is:

1. A method for processing a digital image employing a tone reproduction function generated by normalizing a sample of tone values from the digital image, said tone reproduction function relating tone values in the digital image to values of a standard variate, and being applied to the tone values of said digital image to produce processed tone values, characterized by the steps of:

testing the sample of tone values for skewness; and if the absolute value of the skewness of the sample exceeds a predetermined value, applying an exposure bias to the processed tone values in an amount equal to the value of the standard variate computed for the mean of the sample of tone values minus the value of the standard variate computed for the mode of the sample of tone values.

2. The digital image processing method of claim 1, wherein the skewness is calculated as the square of the third standardized central moment of the sample of tone values, and the predetermined value is 1.0.

3. A method for processing a digital color image having three color components employing three color reproduction functions generated by normalizing respective samples of color values from the three color components of the digital color image, said color reproduction functions relating color values in the color components to values of a standard variate, and being applied to the color values to produce processed color values, characterized by:

testing one of the samples of color values for skewness, and if the absolute value of the skewness of the one sample exceeds a predetermined value, generating an exposure bias equal to the value of the standard variate computed for the mean of the one sample of color values minus the value of the standard variate computed for the mode of the one sample of color values, and applying the bias to the processed color values for all three color components of the digital color image.

4. The invention claimed in claim 3, wherein the color components are red, green and blue, and wherein said one sample of color values is from the green component of the digital color image.

5. The invention claimed in claim 3, wherein the predetermined value is 1.0.

* * * * *